(12) United States Patent (10) Patent No.: US 7,518,327 B2
Newman et al. (45) Date of Patent: Apr. 14, 2009

(54) VEHICLE PANEL CONTROL SYSTEM

(75) Inventors: Todd R. Newman, Traverse City, MI (US); John M. Washeleski, Cadillac, MI (US)

(73) Assignee: Nartron Corporation, Reed City, MI (US)

( * ) Notice: Subject to any disclaimer, the term of this patent is extended or adjusted under 35 U.S.C. 154(b) by 0 days.

(21) Appl. No.: 12/008,010

(22) Filed: Jan. 8, 2008

(65) Prior Publication Data

US 2008/0136358 A1 Jun. 12, 2008

Related U.S. Application Data

(63) Continuation of application No. 11/325,579, filed on Jan. 4, 2006, now Pat. No. 7,342,373.

(51) Int. Cl.
*H02P 1/00* (2006.01)
(52) U.S. Cl. .................. 318/286; 318/468; 318/471
(58) Field of Classification Search .............. 318/286, 318/468, 471, 264, 483, 257, 266, 434, 450; 73/780; 340/438
See application file for complete search history.

(56) References Cited

U.S. PATENT DOCUMENTS

| 3,710,209 A | 1/1973 | Webb et al. |
|---|---|---|
| 3,875,481 A | 4/1975 | Miller et al. |
| 3,951,250 A | 4/1976 | Pointon et al. |
| 3,964,594 A | 6/1976 | Gabbrielli et al. |
| 3,965,399 A | 6/1976 | Walker, Jr. et al. |
| 4,132,487 A | 1/1979 | Fisher |
| 4,186,524 A | 2/1980 | Pelchat |
| 4,266,263 A | 5/1981 | Haberl et al. |
| 4,369,663 A | 1/1983 | Venturello et al. |
| 4,370,697 A | 1/1983 | Haberl et al. |
| 4,373,122 A | 2/1983 | Frame |
| 4,373,124 A | 2/1983 | Frame |
| 4,437,138 A | 3/1984 | Nicol |
| 4,453,112 A | 6/1984 | Sauer et al. |
| 4,503,732 A | 3/1985 | Schust |
| 4,521,685 A | 6/1985 | Rebman |
| 4,526,043 A | 7/1985 | Boie et al. |
| 4,584,625 A | 4/1986 | Kellogg |

(Continued)

FOREIGN PATENT DOCUMENTS

DE 37 34 023 A 4/1989

(Continued)

*Primary Examiner*—Karen Masih
(74) *Attorney, Agent, or Firm*—Brooks Kushman P.C.

(57) ABSTRACT

A system includes a controller and a sensor. The controller transmits a panel control signal to a motor for the motor to move a movable panel of a vehicle along a path between opened and closed positions while the motor receives power from a power source. The motor receives power from the power source upon receiving the panel control signal. The sensor detects objects in the path without monitoring the motor. The sensor generates an object signal indicative of an object being detected in the path of the panel. When the panel is moving in a closing direction, the controller transmits a panel control signal to the motor to reverse movement of the panel to an opening direction upon receiving the object signal in order to prevent the panel from entrapping an object. The controller communicates with vehicle modules over an in-vehicle local area network (LAN).

20 Claims, 10 Drawing Sheets

U.S. PATENT DOCUMENTS

| | | | |
|---|---|---|---|
| 4,662,771 A | 5/1987 | Roe et al. |
| 4,731,548 A | 3/1988 | Ingraham |
| 4,758,735 A | 7/1988 | Ingraham |
| 4,831,279 A | 5/1989 | Ingraham |
| 4,839,512 A | 6/1989 | Speck |
| 4,843,891 A | 7/1989 | Brunner et al. |
| 4,933,807 A | 6/1990 | Duncan |
| 4,976,337 A | 12/1990 | Trett |
| 4,983,896 A | 1/1991 | Sugiyama et al. |
| 5,036,275 A | 7/1991 | Munch et al. |
| 5,087,825 A | 2/1992 | Ingraham |
| 5,131,401 A | 7/1992 | Westenskow et al. |
| 5,142,822 A | 9/1992 | Beckerman |
| 5,159,316 A | 10/1992 | Lazzara |
| 5,210,490 A | 5/1993 | Munch et al. |
| 5,216,364 A | 6/1993 | Ko et al. |
| 5,217,280 A | 6/1993 | Nykerk et al. |
| 5,334,876 A | 8/1994 | Washeleski et al. |
| 5,436,539 A | 7/1995 | Wrenbeck et al. |
| 5,447,076 A | 9/1995 | Ziegler |
| 5,459,962 A | 10/1995 | Bonne et al. |
| 5,483,414 A | 1/1996 | Turtiainen |
| 5,621,290 A | 4/1997 | Heller et al. |
| 5,625,980 A | 5/1997 | Teich et al. |
| 5,642,043 A | 6/1997 | Ko et al. |
| 5,654,615 A | 8/1997 | Brodsky |
| 5,730,165 A | 3/1998 | Philipp |
| 5,775,332 A | 7/1998 | Goldman |
| 5,789,915 A | 8/1998 | Ingraham |
| 5,796,183 A | 8/1998 | Hourmand |
| 5,801,340 A | 9/1998 | Peter |
| 5,832,397 A * | 11/1998 | Yoshida et al. ............... 701/29 |
| 5,851,026 A | 12/1998 | Schoos et al. |
| 5,880,421 A | 3/1999 | Tsuge et al. |
| 5,907,213 A | 5/1999 | Oshima et al. |
| 5,949,207 A | 9/1999 | Luebke et al. |
| 5,952,801 A | 9/1999 | Boisvert et al. |
| 6,006,386 A | 12/1999 | Mohaupt |
| 6,038,930 A | 3/2000 | Lehnen et al. |
| 6,064,165 A | 5/2000 | Boisvert et al. |
| 6,075,298 A | 6/2000 | Maue et al. |
| 6,081,088 A | 6/2000 | Ishihara et al. |
| 6,142,513 A | 11/2000 | Schoos et al. |
| 6,233,872 B1 | 5/2001 | Glagow et al. |
| 6,288,464 B1 | 9/2001 | Torii et al. |
| 6,297,605 B1 | 10/2001 | Butler et al. |
| 6,297,609 B1 | 10/2001 | Takahashi et al. |
| 6,304,048 B1 | 10/2001 | Davies et al. |
| 6,320,335 B1 | 11/2001 | Saitou |
| 6,337,549 B1 | 1/2002 | Bledin |
| 6,377,009 B1 | 4/2002 | Philipp |
| 6,389,752 B1 | 5/2002 | Rosenau |
| 6,404,158 B1 | 6/2002 | Boisvert et al. |
| 6,483,054 B2 | 11/2002 | Suzuki et al. |
| 6,499,359 B1 | 12/2002 | Washeleski et al. |
| 6,515,399 B1 | 2/2003 | Lauf et al. |
| 6,661,642 B2 | 12/2003 | Allen et al. |
| 6,782,759 B2 | 8/2004 | Shank et al. |
| 6,842,148 B2 | 1/2005 | Hendler et al. |
| 6,889,578 B2 | 5/2005 | Spaziani et al. |
| 6,906,487 B2 | 6/2005 | de Frutos |
| 6,936,986 B2 | 8/2005 | Nuber |
| 6,946,853 B2 | 9/2005 | Gifford et al. |
| 6,968,746 B2 | 11/2005 | Shank et al. |
| 7,015,666 B2 | 3/2006 | Staus |
| 7,032,349 B2 | 4/2006 | Oberheide et al. |
| 7,038,414 B2 | 5/2006 | Daniels et al. |
| 7,081,726 B2 | 7/2006 | Abe et al. |
| 7,162,928 B2 | 1/2007 | Shank et al. |
| 2002/0043948 A1 | 4/2002 | Ogasawara |
| 2002/0078758 A1 | 6/2002 | Suzuki et al. |
| 2002/0154039 A1 * | 10/2002 | Lambert et al. ............... 341/33 |
| 2003/0005775 A1 | 1/2003 | Washeleski et al. |
| 2003/0052631 A1 | 3/2003 | Kusunoki |
| 2003/0056600 A1 | 3/2003 | Shank et al. |
| 2003/0089042 A1 | 5/2003 | Oberheide et al. |
| 2003/0151382 A1 | 8/2003 | Daniels et al. |
| 2004/0178924 A1 | 9/2004 | Gifford et al. |
| 2005/0012484 A1 | 1/2005 | Gifford et al. |
| 2005/0016290 A1 | 1/2005 | Shank et al. |
| 2005/0225175 A1 | 10/2005 | Maehara et al. |
| 2006/0117862 A1 * | 6/2006 | Shank et al. ............... 73/780 |

FOREIGN PATENT DOCUMENTS

| | | |
|---|---|---|
| DE | 40 04 353 A1 | 8/1991 |
| DE | 198 10 077 A1 | 9/1998 |
| DE | 197 32 027 A | 1/1999 |
| DE | 197 32 027 A1 | 1/1999 |
| DE | 100 43 909 | 3/2001 |
| EP | 0 855 307 A2 | 7/1998 |
| EP | 1 154 110 A2 | 5/2001 |
| FR | 2 163 814 A | 7/1973 |
| FR | 2 744 548 | 8/1997 |
| JP | 06-160201 | 6/1994 |
| JP | 06-347436 | 12/1994 |
| JP | 07-055615 | 3/1995 |
| JP | 8029271 | 2/1996 |
| JP | 10-076843 | 3/1998 |
| JP | 11-124775 | 5/1999 |
| JP | 2000-249773 | 9/2000 |
| JP | 2001-165786 | 6/2001 |
| WO | WO 97/29391 | 8/1997 |
| WO | WO 98/22836 | 5/1998 |
| WO | WO 98/58821 | 12/1998 |
| WO | WO 01/14171 | 3/2001 |
| WO | WO 02/12669 A1 | 2/2002 |
| WO | WO 03/038220 A1 | 5/2003 |
| WO | WO 2005/059285 | 6/2005 |

* cited by examiner

VEHICLE PANEL CONTROL SYSTEM

CROSS-REFERENCE TO RELATED APPLICATIONS

This application is a continuation of U.S. application Ser. No. 11/325,579, filed Jan. 4, 2006, now U.S. Pat. No. 7,342,373, which is hereby incorporated by reference in its entirety.

BACKGROUND OF THE INVENTION

1. Field of the Invention

The present invention relates to vehicle window lift systems having advanced operating functionality and vehicle occupant safety features for protecting vehicle occupants and for reducing strain and damage to vehicle components.

2. Background Art

The majority of window control systems operate a direct current (DC) motor to control movement of a vehicle window. These window control systems are direct power control systems employing direct power switches. An operator activates a switch from inside the vehicle to directly connect electrical power from the switch to a motor associated with the window. The motor drives the window either open or close depending upon the polarity of the power received via the switch.

"Intelligent" window control systems are replacing direct power control systems. Intelligent window control systems have advanced features for protecting vehicle components and occupants from harm. Intelligent window control systems are solid-state, electronic control systems having microprocessor based electronic control circuitry able to read switch input commands and control the window motor appropriately. Intelligent window control systems provide features such as express open, drop glass, anti-entrapment, and anti-pinch protection. However, significant enhancements can be made to improve on the performance and cost of intelligent window control systems.

SUMMARY OF THE INVENTION

The present invention provides a vehicle window control system which has enhanced features for overall safety and functionality and improves upon the existing occupant safety, performance, and reliability of such systems. In addition to window control, the system is well suited for expansion into specialized vehicle functions. Equipped with remote sensor information and vehicle communications, the system can perform unassisted vehicle functions to improve the safety in vehicles.

In accordance with the present invention, a system having a controller and a sensor is provided. The controller is operable for transmitting a panel control signal to a motor for the motor to move a movable panel of a vehicle along a path between opened and closed positions while the motor receives power from a power source. The motor receives power from the power source upon receiving the panel control signal. The sensor is operable for detecting objects in the path of the panel without monitoring the motor. The sensor generates an object signal indicative of an object being detected in the path of the panel. When the panel is moving in a closing direction, the controller transmits a panel control signal to the motor to reverse movement of the panel to an opening direction upon receiving the object signal in order to prevent the panel from entrapping an object. The controller communicates with vehicle modules over an in-vehicle local area network (LAN). The controller may communicate with the sensor over the LAN.

The sensor may include a compressible dielectric element interposed between two conductors which are separated from one another. The capacitance of the sensor changes in response to either an object in the path of the panel deforming the shape of the sensor while touching the sensor such that the sensor generates the object signal or in response to a conductive object in the path of the panel coming into proximity with the sensor such that the sensor generates the object signal.

The controller may desensitize the object signal to counter effects of the panel on the sensor as the panel moves relative to the sensor.

The controller may receive a command signal from a switch over the LAN upon the switch being activated by an operator. The controller transmits a panel control signal to the motor to move the panel along the path in accordance with the command signal. In particular, the controller may transmit a panel control signal to the motor to move the panel along the path: (i) to the closed position upon receiving an express close panel command signal from the switch over the LAN; (ii) to the opened position upon receiving an express close panel command signal from the switch over the LAN; (iii) in a closing direction while receiving a manual close panel command signal from the switch over the LAN; and (iv) in an opening direction while receiving a manual open panel command signal from the switch over the LAN. The controller may abort an express panel command upon receiving a manual panel command. The controller may abort an express panel command for one of the opening and closing directions upon receiving an express panel command for the opposite direction.

The controller may receive an internal temperature signal indicative of the temperature of the vehicle interior from an interior temperature sensor over the LAN and an external temperature signal indicative of the temperature outside of the vehicle from an external temperature sensor over the LAN. In this case, the controller may transmit a panel control signal to the motor to move the panel in the opening direction in order to vent the vehicle upon the controller determining that vehicle venting is desired based on a comparison of the temperature signals.

The controller may receive an occupant signal indicative of the absence of occupants in the vehicle from an occupant detection sensor over the LAN. In this case, the controller generates an alarm signal indicative of vehicle intrusion upon receiving the object signal from the sensor after the panel has been moved in the opening direction while the vehicle is unoccupied.

The controller may transmit a panel control signal to move the panel in the opening direction in order to vent the vehicle upon the controller determining that vehicle venting is desired based on a comparison of the temperature signals when the vehicle is in operation.

The controller is operable to communicate with a rain sensor of the vehicle over the LAN. In this case, the controller receives a rain sensor signal indicative of moisture outside the vehicle from the rain sensor over the LAN, and transmits a panel control signal to the motor to move the panel in the closing direction upon the controller determining the presence of moisture outside of the vehicle based on the rain signal.

The controller transmits a vent control signal to a venting component of the vehicle via the LAN in order for the venting component to vent the vehicle upon the controller determining that the vehicle venting via the venting component is desired based on a comparison of the temperature signals. The venting component may be one of a vehicle sunroof and a vehicle HVAC system. The controller may transmit a vent control signal to the venting component in order to vent the vehicle when the internal temperature exceeds the external temperature by a predetermined amount and the vehicle is unoccupied. The controller may transmit a vent control signal to the venting component in order to vent the vehicle when the internal temperature exceeds the external temperature by a predetermined amount and the vehicle is in operation.

The system may further include a second controller and a second sensor. The second controller is operable for transmitting a panel control signal to a second motor for the second motor to move a second movable panel of the vehicle along a path between opened and closed positions while the second motor receives power from the second power source. The second motor receives power from the second power source upon receiving the panel control signal. The second sensor is operable for detecting objects in the path of the second panel without monitoring the second motor. The second sensor generates an object signal indicative of an object being detected in the path of the second panel. When the second panel is moving in a closing direction, the second controller transmits a panel control signal to the motor to reverse movement of the second panel to an opening direction upon receiving the object signal in order to prevent the second panel from entrapping an object. The second controller communicates with vehicle modules over the LAN. The controllers may communicate with one another over the LAN which may be either a wired LAN or a wireless LAN.

The controller may include memory for storing the position of the panel along the path prior to the vehicle being turned off. The controller transmits a panel control signal to move the panel from the closed position to an opened position stored in memory upon receiving a preset panel open command. The controller may receive the panel open command from a remote keyless entry component.

The controller may be operable for transmitting a panel control signal to move the panel during a predetermined time period after the vehicle has been turned off.

Objects, features, and advantages of the present invention are readily apparent from the following detailed description of the preferred embodiment(s) when taken in connection with the accompanying drawings.

DETAILED DESCRIPTION OF THE PREFERRED EMBODIMENT(S)

Figure 1:
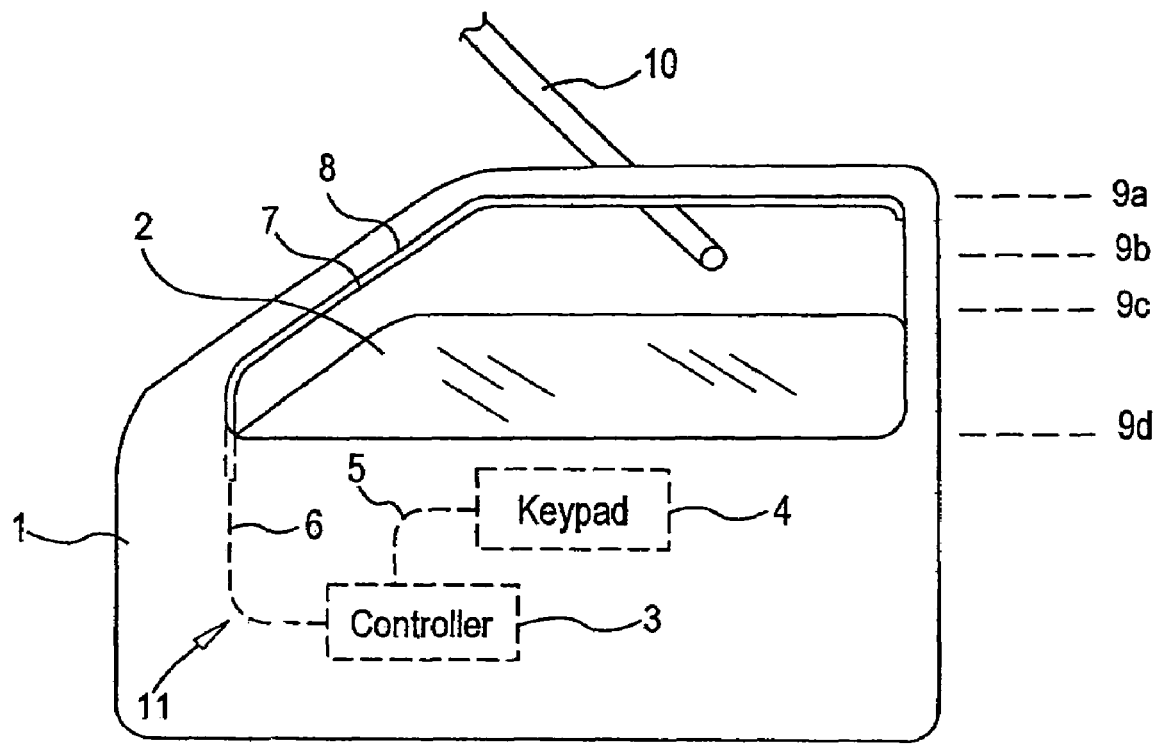
FIG. 1 illustrates a control system in accordance with an embodiment of the present invention.
Figure 2:
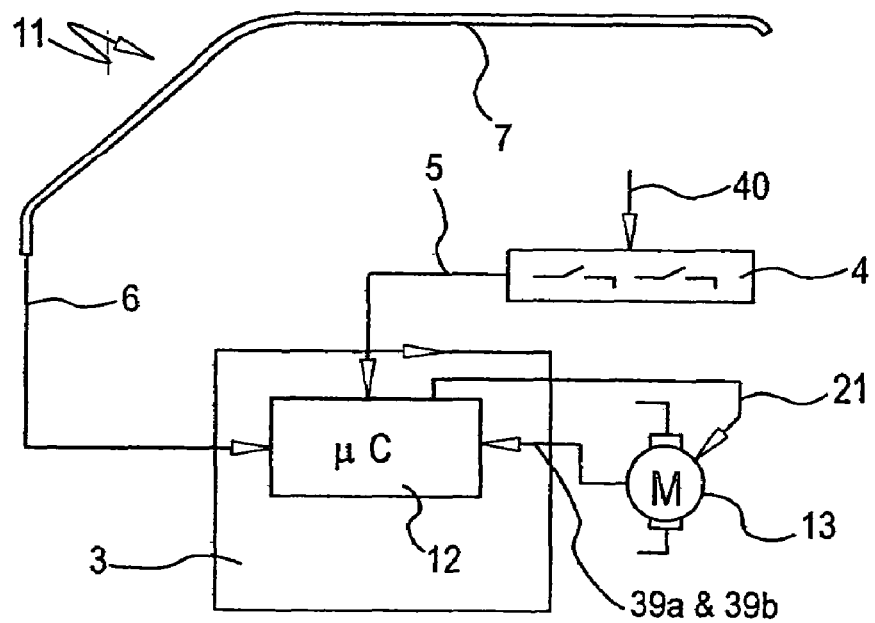
FIG. 2 illustrates in greater detail the control system in accordance with an embodiment of the present invention.

Referring now to FIGS. 1 and 2, a control system 11 in accordance with an embodiment of the present invention is shown. Control system 11 functions as an anti-entrapment panel lift system for controlling and monitoring movement of a movable panel such as a window 2 of a vehicle door 1. Window 2 is movable along a path between opened and closed positions. Control system 11 includes a controller 3 and a primary sensor 7.

Sensor 7 is generally operable for detecting objects placed in the path of window 2. Sensor 7 is located at a position on the window frame of vehicle door 1 to detect objects in the entire path of window 2 and/or to detect objects in the path of the window near the closed position of the window. Sensor 7 is preferably a capacitance sensor operable to detect being touched by an object and/or operable to detect the presence (i.e., proximity) of an electrically conductive object near the sensor. In either event, objects detected by sensor 7 will be in the path of window 2.

Sensor 7 has a capacitance at any given time and the sensor outputs a sensor signal 6 indicative of the capacitance. The capacitance of sensor 7 changes in response to an electrically conductive object such as a human body part (e.g., a finger) touching the sensor or in response to a non-electrically conductive object such as a piece of wood touching the sensor. In this event, the capacitance of sensor 7 changes because separated conductors of the sensor move relative to one another upon the sensor being touched. Similarly, the capacitance of sensor 7 changes in response to an electrically conductive object coming within the proximity of the sensor. In this event, the capacitance of sensor 7 changes because the electrically conductive object disrupts the electrical fields extending between the separated conductors of the sensor. In the latter event, the capacitance of sensor 7 changes even without the object actually touching or applying any force to the sensor. In either event (touch by an object on sensor 7 or proximity of an object to the sensor), the sensor provides a sensor signal 6 indicative of the sensor capacitance at the time of the detection event to controller 3. As such, sensor signal 6 is an "object signal" or an "anti-entrapment signal" which is indicative of the presence of an object in the path of window 2.

Controller 3 is a microprocessor-based controller having a microprocessor 12. Controller 3 energizes a window lift motor 13 associated with window 2 to move the window along its path in a closing (opening) direction between opened and closed positions to close (open) the window. Motor 13 is driven to move window 2 upon receiving electrical power. Motor 13 receives electrical power directly from a power source when the power source is enabled to provide power to the motor. Controller 3 energizes motor 13 by providing an electronic signal (i.e., a panel control signal) from a panel control output 21 to the motor such that the power source is enabled to apply power to the motor to drive the motor. As such, the power applied to motor 13 is not transferred from controller 3 to the motor. In contrast, controller 3 provides an electronic signal which acts as a power source switching signal for enabling the power source to directly apply power to motor 13.

An operator uses a keypad 4 to provide input switch commands 5 to controller 3 for controlling window 2 movement. When an operator issues a command 5 to close window 2, controller 3 energizes motor 13 and monitors sensor signal 6 to detect the touch/presence of an object 10 (i.e., obstruction, obstacle, etc.) in the path of the window as the window is closing. In general, controller 3 reverses the direction of window 2 and opens the window upon sensor 7 detecting an object 10 in the path of the window when the window is closing. Controller 3 stops window 2 from closing further and opens the window in this event in order to prevent the window from entrapping the object. As such, an entrapment condition occurs when an object 10 is detected in the path of window 2 when the window is closing. In general, controller 3 monitors sensor signal 6 and controls window 2 movement to prevent such an entrapment condition.

Input commands 5 include automatic input commands such as express open and express close. In response to receiving an express open (close) command 5 from keypad 4, controller 3 moves window 2 in an opening (closing) direction until the window is fully opened (closed) without requiring any further input commands from the operator. Input commands 5 further include manual input commands such as open (i.e., manual-down) and close (i.e., manual-up). In response to receiving a manual open (close) command 5 from keypad 4, controller 3 moves window 2 in an opening (closing) direction while the operator is operating the keypad to provide such manual commands.

As window 2 opens and closes, controller 3 continuously tracks window position 39a and window speed 39b indirectly from armature rotation of motor 13. Controller 3 responds to operating situations with advanced positioning maneuvers by knowing window position 39a. Controller 3 monitors window speed 39b to determine loading and stalling conditions of window 2.

Controller 3 uses window speed 39b as a redundant secondary input for detecting an object 10 in the path of window 2 as the window closes. In the event that sensor 7 becomes inoperable and cannot provide sensor signal 6, controller 3 uses window speed 39b as the primary signal for detecting an object 10 in the path of window 2 until the sensor signal is restored. Controller 3 performs window movements (particularly window closing movements) in relatively small and predetermined increments while sensor 7 is inoperable. This limp mode response permits closure of window 2 while insuring that an object 10 in the path of the window does not experience high entrapment forces from the window before the redundant speed sensing information indicates an entrapment condition. The limp mode response provides direct feedback to an operator by way of the incremental movements that control system 11 is not fully functional and requires service.

Figure 3:
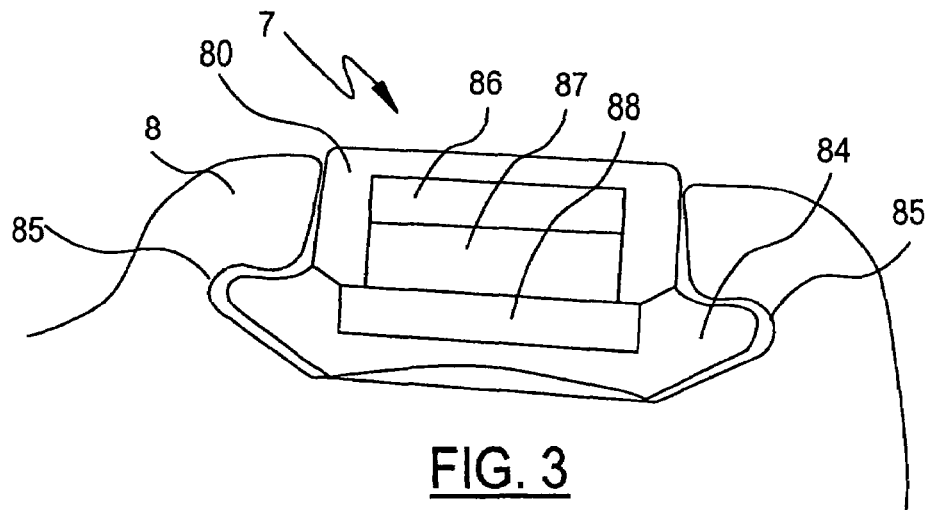
FIG. 3 illustrates a cross-sectional view of the control system sensor as assembled into a weather seal in accordance with an embodiment of the present invention.

Referring now to FIG. 3, with continual reference to FIGS. 1 and 2, a cross-sectional view of sensor 7 as assembled into a weather seal 8 of vehicle door 1 in accordance with an embodiment of the present invention is shown. As shown in FIG. 3, sensor 7 is a capacitance sensor having a compressible dielectric element 87 interposed between first and second conductors 86 and 88. Weather seal 8 receives sensor 7 in such a way that the sensor maintains its position adjacent to window 2 as the window moves towards and away from the seal. Seal 8 has an undercut 85 for holding sensor 7 in place. Sensor 7 inversely has a base mantel 84 comprised of thermoplastic polyolefin (TPO). Base mantel 84 has a dimension wider than a main body jacket 80 of sensor 7. Main body jacket 80 is comprised of thermoplastic vulcanizate (TPV). When inserted into seal 8, base mantel 84 seats into undercut 85 of the seal to hold sensor 7 in place. This seating characteristic between seal 8 and sensor 7 eliminates the need for bonding between these components and allows for rapid installation and removal of the sensor from the seal.

Figure 4:
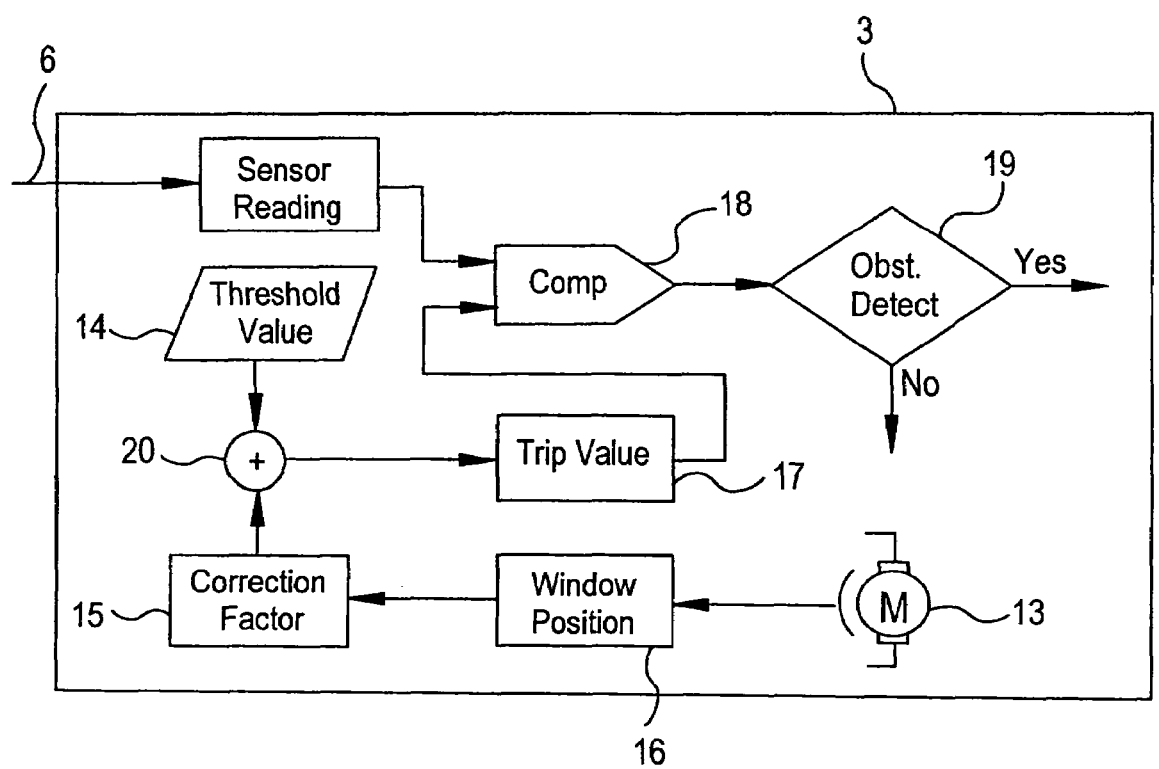
FIG. 4 illustrates a block diagram of the sensor desensitization logic employed by the control system controller in accordance with an embodiment of the present invention.

Referring now to FIG. 4, with continual reference to FIGS. 1 and 2, a block diagram of the sensor desensitization logic employed by controller 3 in accordance with an embodiment of the present invention is shown. The position of window 2 relative to sensor 7 can bias sensor signal 6 towards false entrapment detection of an object. Controller 3 employs a software algorithm to desensitize sensor signal 6 from the influence of window 2 to reduce the possibility of false entrapment detection. In general, controller 3 desensitizes sensor signal 6 based on knowledge of the current window 2 position and end-of-travel (i.e., opened and closed) window position to counter effects created by the window as the window moves relative to sensor 7.

FIG. 4 illustrates the data processing stages for desensitization of sensor signal 6. As window 2 travels relative to sensor 7, controller 3 calculates a correction factor 15 based on a current position 16 of window 2. A summer 20 sums correction factor 15 with an object detection threshold value 14 representative of the anti-entrapment detection function. The summed output is a new trip threshold value 17 having the correct sensitivity for current window position 16. Controller 3 compares sensor signal 6 with new trip threshold value 17 in a comparator 18. If sensor signal 6 meets or exceeds new trip threshold value 17, then controller 3 detects the presence of an object 10 in the path of window 2 as indicated in decision block 19. If sensor signal is below new trip threshold value 17, then controller 3 determines that an object is not in the path of window 2 as indicated in decision block 19.

In general, controller 3 determines whether an object is in the path of window 2 by comparing sensor signal 6 with object detection threshold value 14. Object detection threshold value 14 represents an anti-entrapment function value indicative of an object being in the path of window 2. Object detection threshold value 14 is a fairly reliable indicator when window 2 is at a position relatively far from sensor 7. A problem occurs when window 2 is at a position relatively near to sensor 7 as the window itself may influence the capacitance of the sensor. Correction factor 15 represents the window influences on sensor 7 when window 2 is relatively near to the sensor. As such, new trip threshold value 17, which is the sum of object detection threshold value 14 and correction factor 15, represents an anti-entrapment function value indicative of an object being in the path of window 2 when the window is relatively near to sensor 7. That is, new trip threshold value 17 represents an anti-entrapment function value which takes into account influences made by window 2 on sensor 7 when the window is relatively near the sensor. Correction factor 15 is implemented as either a table of correction values that coincide with current window position 16 or as an equation.

In operation, controller 3 ignores sensor signal 6 while window 2 enters seal 8 to further reduce false entrapment detection. With reference to FIG. 1, controller 3 ignores sensor signal 6 when the position of window 2 is within a threshold distance such as four millimeters below full window closure 9a. This threshold distance is software programmable and provides sufficient protection for vehicle occupants from window entrapment during window closure. As such, during window 2 closure when the window is within the threshold distance from full window closure 9a, controller 3 inhibits the anti-entrapment function in order to prevent false entrapment detection as the window seats into seal 8.

For advanced switch inputs 5, controller 3 cancels any express window command in progress while receiving a manual switch command to open or close window 2 from keypad 4. Controller 3 then immediately performs the manual command. This ensures that the operator remains in control of window 2 movement during automatic functions and at all times.

Controller 3 aborts performing an express open or close operation and stops window 2 from moving upon receiving a second express command for the opposite direction. This action allows the operator to advance window 2 to window position 9c in either direction using the express feature and then stop the window without initiating a new command switch input 5.

When controller 3 detects an object 10 during window 2 closure a logical response of the controller is to reverse the movement direction of the window to release the object from being entrapped between the window and the vehicle door window frame. For security and functionality reasons it is undesirable to have window 2 return to its fully opened position 9d whenever an object is detected in the window path. In most cases opening window 2 a few millimeters is all that is needed to release an object from window entrapment. If the object caught in the path of window 2 is a person's neck, then it becomes necessary for controller 3 to open the window far enough for the person to remove their head out of the window path. A minimum window opening 9b is defined where the window opening is considered large enough to safely remove a person's head should it be trapped by window 2. Minimum window opening 9b (also referred to as the "midpoint position") is the position of window 2 when the window is approximately two hundred millimeters from full window closure 9a.

Controller 3 performs enhanced responses to object detection as a function of midpoint position 9b. In general, controller 3 performs a unique window response at entrapment detection when window 2 is above midpoint position 9b. This response improves upon occupant safety. Likewise, controller 3 performs a unique response when window 2 is below midpoint position 9b. This response improves upon occupant security.

In particular, during a manual close operation, controller 3 opens window 2 five millimeters from its current position upon object detection while the operator activates manual-up switch 4. Controller 3 performs one of three possible operations when the operator releases manual-up switch 4. If at the time of detection of object 10 the position of window 2 is higher than midpoint position 9b (i.e., within two hundred millimeters of full window closure 9a), then controller 3 opens the window to midpoint position 9b. Controller 3 opens window 2 an additional twenty millimeters if at the time of detection of object 10 the position of the window is lower than midpoint distance 9b (i.e., farther than two hundred millimeters from full window closure 9a). Finally, if the operator does not release manual-up switch 4 within a specified time such as two seconds, then controller 3 does not perform the secondary window motion after the operator releases switch 4. Cancellation of the secondary window motion functions as a security override preventing window 2 from opening further should the operator need the window to remain up.

Controller 3 opens window 2 twenty-five millimeters from its current position (such as window position 9c) upon detection of an object 10 if the detection occurs when the window is lower than midpoint position 9b during an express close operation. Controller 3 opens window 2 to midpoint position 9b upon detection of an object 10 if the detection occurs when the window is higher than midpoint position 9b during an express open operation.

Controller 3 receives an ignition input signal 40 from the vehicle while the vehicle is in operation (e.g., while the vehicle is running or when the vehicle battery is on). Control system 11 remains active for a predetermined time after ignition signal 40 is off to permit the operator to close or adjust the position of window 2. Control system 11 remains active beyond this predetermined time if an active window command 5 is still present or if controller 3 has not completed an object detection response in progress.

Figure 5:
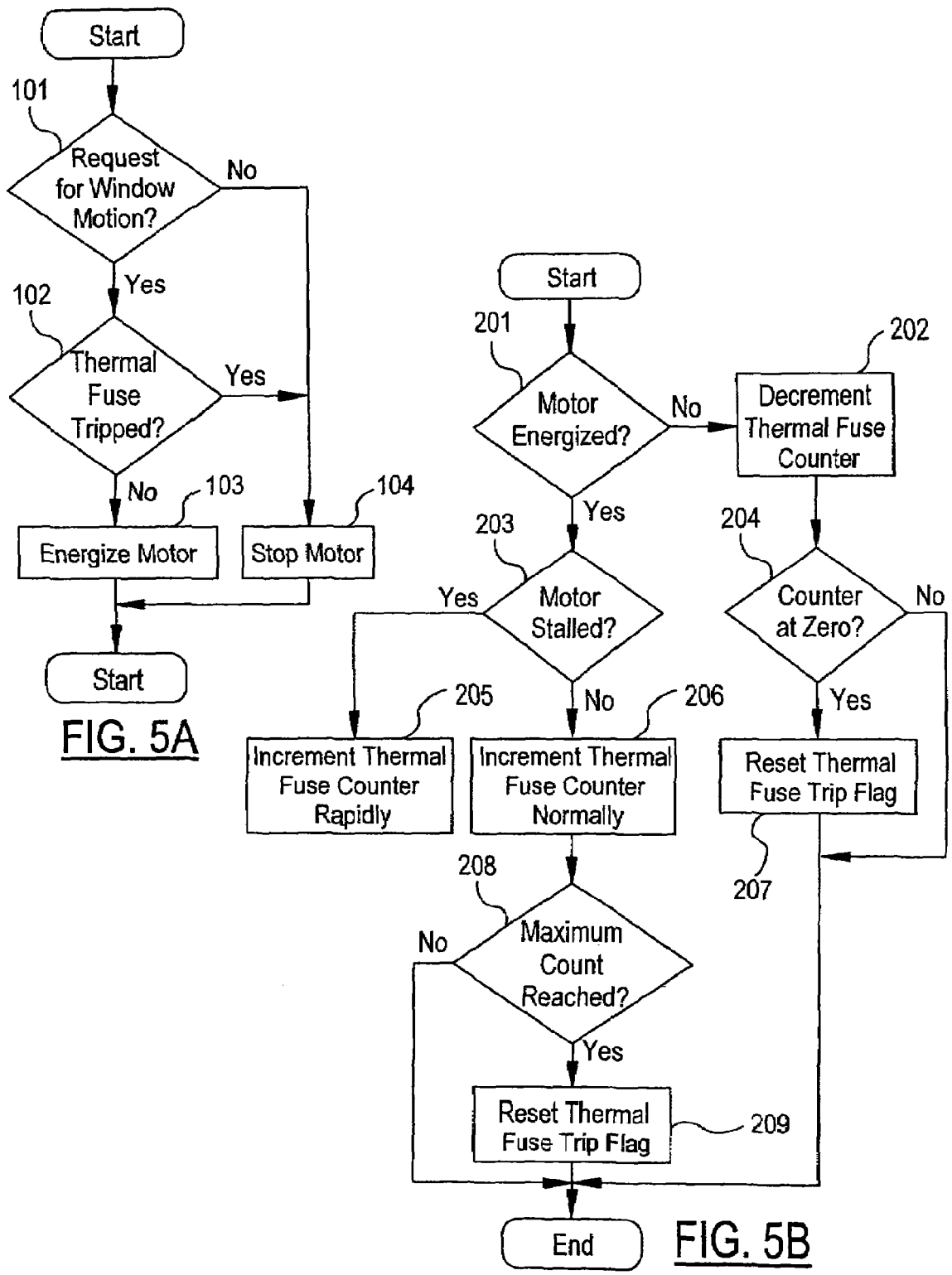
FIGS. 5a and 5b illustrate flowcharts describing operation of the control system controller for emulating a resettable thermal fuse in accordance with an embodiment of the present invention.

Referring now to FIGS. 5a and 5b, with continual reference to FIGS. 1 and 2, flowcharts describing operation of controller 3 for emulating a resettable thermal fuse in accordance with an embodiment of the present invention are shown. In general, controller 3 emulates the function of a resettable thermal fuse to thermally protect motor 13, adjacent circuitry, and drive components including its power source against overheating caused by continuous motor operation. In general, controller 3 denies power to motor 13 whenever window 2 operation is abused such as when children play with keypad switch 4.

The flowchart of FIG. 5a illustrates the general operation of controller 3 for emulating a resettable thermal fuse. In operation, controller 3 determines whether a request for window motion has been issued as shown in block 101. If no window motion request is present, then controller 3 stops motor 13 as shown in block 104. If a window motion request is present, then controller 3 determines whether its thermal fuse function has tripped as shown in block 102. If its thermal fuse function has not tripped, then controller 3 energizes motor 13 as shown in block 103 to move window 2 in accordance with the window motion request. If its thermal fuse function has tripped, then controller 3 stops motor 13 as shown in block 104. In this event, controller 3 does not perform the window motion request.

The flowchart of FIG. 5b illustrates the operation carried out by controller 3 for determining whether its thermal fuse function has tripped. In operation, controller 3 determines whether it is energizing motor 13 as shown in block 201. If controller 3 is energizing motor 13, then the controller determines whether the motor has stalled as shown in block 203. If controller 3 is energizing motor 13 and if the motor has stalled, then the controller increments a thermal fuse counter at a rapid rate as shown in block 205. If controller 3 is energizing motor 13 and if the motor has not stalled, then the controller increments the thermal fuse counter at a normal rate as shown in block 206. As such, controller 3 increments the thermal fuse counter (i.e., an internal software counter) whenever motor 13 is energized as shown in blocks 205 and 206; the controller increments the counter at a normal rate during proper motor operation (as shown in block 206) and at a faster rate when the motor is stalled (as shown in block 205). Controller 3 compares the counter to a maximum count value as shown in block 208. The maximum count value signifies that motor 13 has been over worked and is likely overheated. In the event that the counter is greater than the maximum count value, the thermal fuse is tripped as shown in block 209 (i.e., the decision of block 102 shown in FIG. 5a is "yes"). As a result, controller 3 inhibits operation of motor 13 as shown in block 104 of FIG. 5a until the counter has returned to a lower value signifying that the motor has cooled down. Controller 3 can use other sensed motor operating parameters such as motor speed, current, voltage, ambient temperature, and cycling profile to modify the counter increment rates of blocks 205 and 206. The counter increment rates are either fixed or dynamic depending upon the implementation of the software function.

If controller 3 is not energizing motor 13 as shown in block 201, then the controller decrements the counter at a given rate as shown in block 202. The counter decrement rate is either fixed or dynamic depending upon the software function implementation. Controller 3 then determines whether the counter has returned to zero as shown in block 204. If the counter has returned to zero, then controller 3 resets the thermal fuse trip flag as shown in block 207 and permits operation of motor 13.

The thermal fuse function emulation performed by controller 3 has a direct advantage over conventional types of thermal fuses as motor 13 remains operational to perform safety related functions yet the controller limits operating privileges in order to cool down the motor. A thermal sensor can be placed at motor 13 to directly measure the operating temperature of the motor to improve the reliability of this function. Either way, controller 3 retains control over motor 13 as opposed to a thermally triggered passive component, such as a positive temperature coefficient thermistor commonly used in motors for thermal protection, retaining motor control.

Controller 3 controls motor 13 such that any forces exerted by window 2 on an object 10 placed in the path of the window as the window is closing are low forces. This low closure force characteristic permits unattended window 2 movement while maintaining a high degree of safety. As a result a number of new automatic/advanced window and vehicle functions are possible.

As will be described with reference to FIG. 13, one such window function performed by controller 3 is automatically closing window 2 when an operator exits and locks the vehicle or when ignition signal 40 is removed. Likewise, when the operator returns and unlocks the vehicle, controller 3 automatically reopens window 2 to its previous position.

Figure 13:
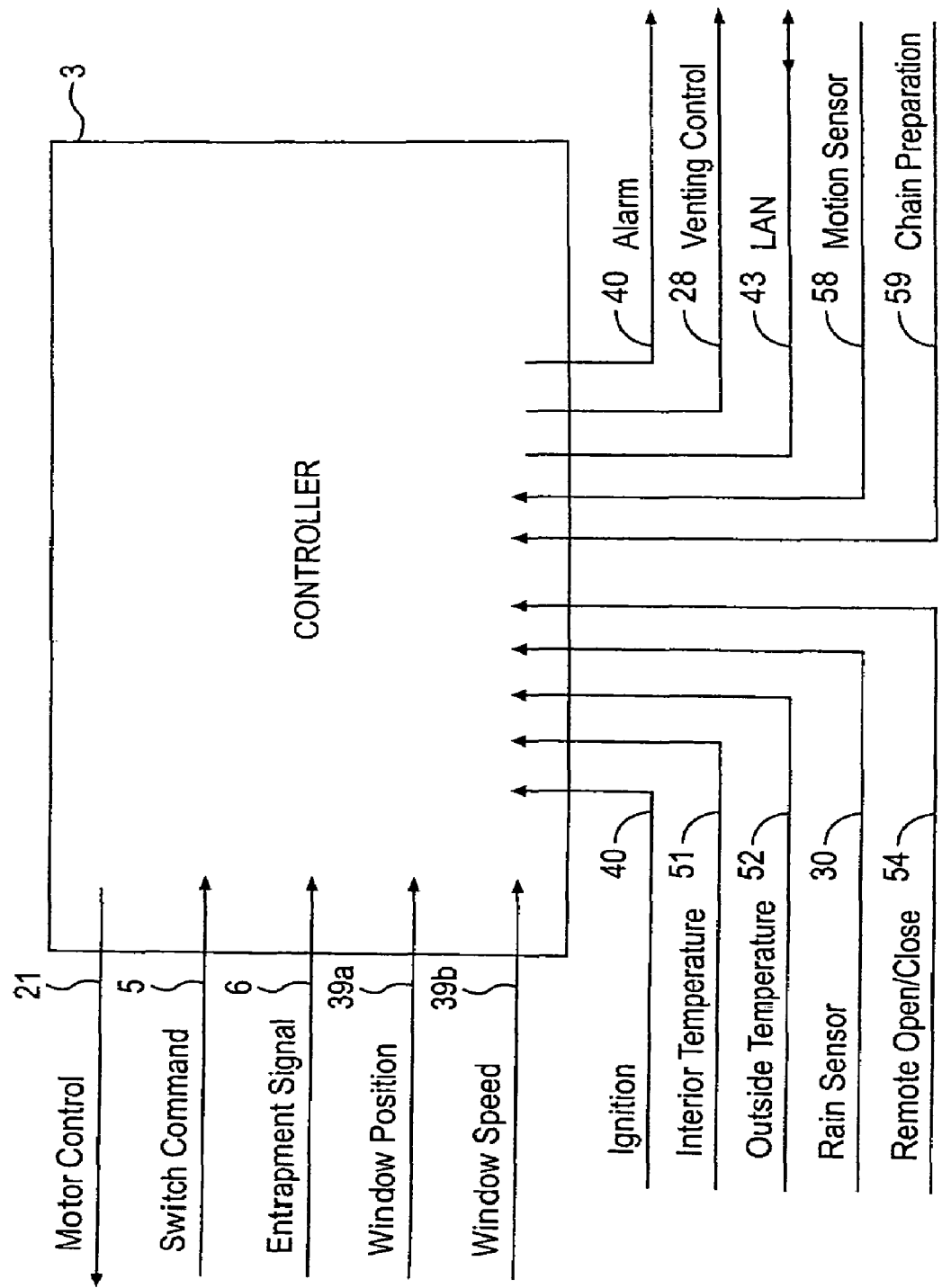
FIG. 13 illustrates the inputs and outputs of the control system controller for supporting advanced vehicle functions in accordance with an embodiment of the present invention.

Referring now to FIG. 13, with continual reference to FIGS. 1 and 2, inputs and outputs of controller 3 for supporting automatic/advanced window and vehicle functions in accordance with an embodiment of the present invention are shown. In the events of the operator unlocking and locking the vehicle, controller 3 receives commands to automatically open and close window 2 on a remote open/close input 54. A local area network (LAN) 43 can communicate such commands to controller 3 as well. When controller 3 receives the close command the controller attempts to close window 2. If controller 3 detects an object 10 in the path of window 2 as the window is closing, then the controller opens the window accordingly and provides a signal on an alarm output 45 indicating that it is unable to close the window. Alarm output 45 can be connected to audio or visual alarm annunciators or fed to other vehicle systems able to provide a response to the failure condition.

The open and close command signals 54 can originate from a mechanical switch triggered by actuation of a lock mechanism of vehicle door 1 or from operator activation of an electric door lock switch of the vehicle door. Another approach is for signals 54 to originate from a Remote Keyless Entry (RKE) system. In this case, when an operator presses the lock button of the key FOB, the RKE system sends a close command signal 54 to controller 3 for the controller to close window 2. Likewise, when an operator presses the unlock button of the key FOB, the RKE system sends an open command signal 54 to controller 3 for the controller to reopen window 2 to its previous position. Another approach is controller 3 automatically closing window 2 a predetermined time after ignition signal 40 is off.

Another automatic/advanced window function is directed to vehicle air venting. The venting of hot air out from the vehicle maintains lower interior temperatures while the vehicle is unattended. Venting reduces demands on the air conditioning system of the vehicle and decreases the initial cool down time for cooling the vehicle interior.

Figure 6:
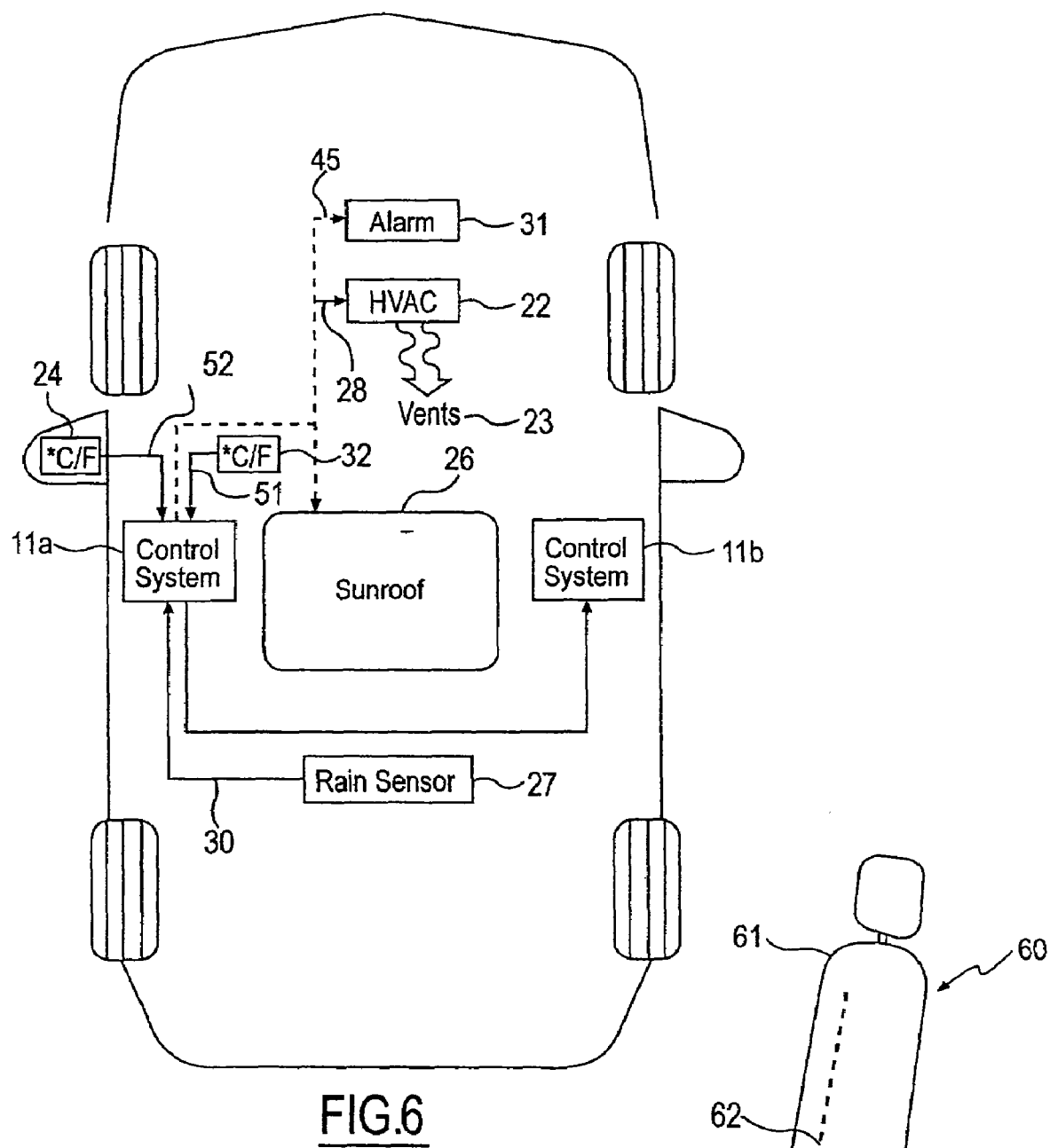
FIG. 6 illustrates the control system interconnected in a vehicle to venting components of the vehicle by communication interconnects in accordance with an embodiment of the present invention.

Referring now to FIG. 6, with continual reference to FIGS. 1, 2, and 13, control system 11 interconnected in a vehicle to the venting components of the vehicle by communication interconnects in accordance with an embodiment of the present invention is shown. The embodiment of FIG. 6 includes two control systems 11a and 11b. Control systems 11a and 11b are communicable with one another as will be described with reference to FIGS. 9, 10, 11, and 12. Control system 11a is associated with a driver-side window, a vehicle HVAC system 22, an outside temperature sensor 24, a sunroof 26, a rain sensor 27, an alarm system 31, and a vehicle interior temperature sensor 32. Control system 11b is associated with a passenger-side window.

Control system 11a (i.e., the controller of control system 11a) receives an outside temperature signal 52 indicative of the temperature outside of the vehicle from outside temperature sensor 24 and receives a vehicle interior temperature signal 51 indicative of the vehicle interior temperature from vehicle interior temperature sensor 32. Control system 11a processes temperature signals 51 and 52 to determine if venting of the vehicle is necessary when the vehicle is parked and off (i.e., when ignition input 40 is off).

On hot days and during periods of direct sunlight exposure, an enclosed and unattended vehicle can experience a rise in interior temperature of +40° F. or more above the outside ambient temperature. As the sun moves in the sky, vehicles once parked in the shade can later be found in direct sun exposure. Weather conditions can change from overcast to clear leaving vehicles directly exposed to the sun. Persons returning to such an enclosed vehicle are likely to open a vehicle door and wait for the hot air to vent out. They eventually enter the vehicle, enduring the radiant heat still given off by the interior, open the windows, turn on the air conditioning, and then continue on their way. High temperatures are harmful to vehicle occupants and interiors. Animals left unattended in vehicles can suffer from dehydration and heat stroke. Prolonged or repeated heat exposure damages vehicle interiors while hot interiors place greater demands on the air conditioning system when operated.

Venting hot air from a vehicle interior can reduce vehicle interior temperatures. A simple and effective means of keeping vehicles cooler is by opening the windows to allow air exchange with that outside. If however the vehicle is unattended, then opened windows can place the vehicle at a security risk. Also, if weather conditions change, an opened window can leave a once dry interior soaking wet in a matter of minutes.

As such, if control system 11a determines that the vehicle interior temperature is hotter than a predetermined high temperature and the outside temperature is cooler than the vehicle interior temperature by at least a predetermined amount, then control system 11a performs venting by automatically opening the driver-side window to draw outside air through the driver-side window in order ventilate the vehicle interior. Control system 11a shares the temperature information and comparisons with control system 11b. Accordingly, control system 11b assists in the venting by automatically opening the passenger-side window to draw outside air through the passenger-side window in order to ventilate the vehicle interior.

When equipped with venting control outputs 28 or linked by a LAN interface 43 to other vehicle control systems, control system 11a can instruct other components in the vehicle to assist in the venting process. Other vehicle systems that enhance the venting process include HVAC system 22 and sunroof 26. Control system 11a accelerates and maximizes venting by turning on HVAC blower 22 and/or by opening sunroof 26 in order to draw outside air 23 into the vehicle. Once the vehicle interior temperature reaches a predetermined low temperature, control systems 11 automatically return the windows and other systems assisting in the venting process (i.e., HVAC blower 22, sunroof 26) to their original state. Alternatively, control systems 11 automatically adjust these systems to a modified state to continue regulating at the new lower vehicle interior temperature. For example, control system 11a returns the driver-side window and/or sunroof 26, if originally closed, to a predetermined vent position to permit continued exchange of outside air with vehicle interior air.

If venting is ineffective at lowering the interior vehicle temperature, control system 11a can warn the operator by providing an alarm signal from its alarm output 45 to alarm system 31. Alarm system 31 includes audio or visual alarm annunciators for providing a response to this condition.

Control system 11a receives a rain sensor signal 30 from a rain sensor 27 which monitors the presence of rain (or water from a water sprinkler) outside of the vehicle. When rain sensor 27 senses rain, control system 11a cancels or modifies the venting process to protect the vehicle interior from rain damage. For example, control system 11a fully closes the driver-side window and sunroof 26 during a rain event to prevent rain from entering the vehicle but continues operating HVAC blower 22 to vent the vehicle.

As such, rain sensor 27 not only assists control systems 11 with unattended venting but also protects the vehicle interior from water damage brought on by rain or irrigation systems and assists the control systems in closing the windows when water is sensed. Control systems 11 automatically close the windows intentionally left open by vehicle occupants in the presence of water to protect vehicle interiors and personal contents. Whether the vehicle is in operation or unattended, control systems 11 assist the vehicle occupants by automatically closing the windows when rain sensor 27 detects rain.

As such, control systems 11 automatically close the windows and sunroof 26 while the vehicle is being operated in the event that rain is detected. This feature is applicable to other powered moving panels such as a sliding door, a hatch, a trunk lid, a convertible top, or a tonneau cover associated with a control system 11. This feature protects the vehicle interior from rain damage when a window or another vehicle panel is intentionally left open. Likewise, this feature can be active while a motion sensor provides to control system 11a a motion signal 58 indicative of the vehicle being in motion thereby relieving the vehicle operator of the responsibility and distraction of closing powered panel moving panels such as the windows and the sunroof when rain is encountered.

When a vehicle panel such as a window is open during the venting process the vehicle is more vulnerable to intrusion from an outsider. As such, for security and safety reasons, the anti-entrapment sensing of control systems 11 remains active during the venting process and whenever the vehicle security is active to assist in detecting vehicle intrusion. When a control system 11 detects an object 10 in the path of a window 2 and the vehicle security is activated, the control system outputs an alarm signal from its alarm output 45 to alarm system 31. In turn, alarm system 31 generates an alarm signifying an object or intruder breaching the window opening. Control system 11 responds to the window breach by cancelling the venting process and closing the window (after or before) the object is removed from the window opening. As such, if security or weather conditions do not permit opening of the windows and/or the sunroof, then control system 11 can instruct HVAC system 22 to draw outside air into the vehicle for venting.

In sum, having the two temperature inputs and the rain input, control system 11 can manage venting of an unattended vehicle. When the vehicle interior temperature exceeds the outside ambient temperature, control system 11 opens window 2 to exchange hot internal air with cooler outside air. Once cooler internal temperatures are reached or if rain sensor 27 detects rain, control system 11 closes window 2. If vehicle security is a concern, control system 11 remains armed to sense and respond to entrapment detection. This way if someone attempts to enter the vehicle through window 2, control system 11 activates security alarm system 31.

Figure 7:
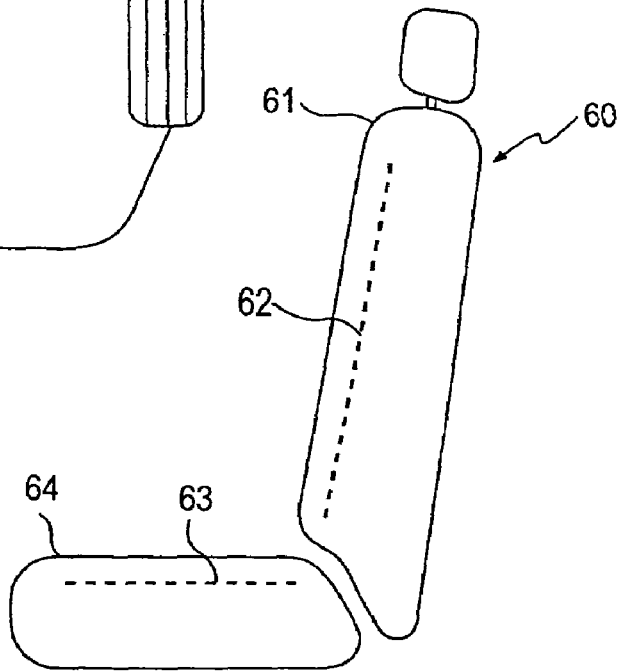
FIG. 7 illustrates a vehicle seat having occupant detection sensors in accordance with an embodiment of the present invention.

Referring now to FIG. 7, with continual reference to FIGS. 1, 2, and 13, a vehicle seat assembly 60 having occupant detection sensors 62 and 63 in accordance with an embodiment of the present invention is shown. Occupant detection sensors 62 and 63 are respectively placed into seat back 61 and seat 64 of seat assembly 60. Other occupant detection sensors may be placed along vehicle door 1 and inside head liners. Occupant detection sensors 62 and 63 provide detailed information about what is on seat assembly 60 or in the vehicle. Occupant detection sensors 62 and 63 employ proximity and force sensor matrices to sense motion, weight, and dimensional characteristics of objects such as child seats, infant carriers, or persons placed on seat assembly 60. Infrared, motion, and audio sensors can be used to further differentiate between living and inanimate objects placed on seat assembly 60.

Occupant detection sensors in vehicles are typically reserved for use by the air-bag deployment system of the vehicle. However, when connected through a communication network of the vehicle such as LAN 43, controller 3 can receive occupant detection sensor information from the air-bag deployment system (or directly from the occupant detection sensors themselves) to assist in determining if an infant, young child, or animal is in the vehicle.

Controller 3 further monitors ignition signal 40, the vehicle door activity, and the vehicle door lock status to determine when the operator is leaving the vehicle. If controller 3 senses the presence of persons or animals inside the vehicle, then the controller sends a warning signal 45 to the operator indicating that the vehicle has been exited while occupants remain in the vehicle. This warning can be given to the operator by sounding a security alarm 31 or vehicle horn or by signaling a two-way key FOB to get the attention of the operator. As a last level of protection controller 3 can perform the venting operation to help ensure the safety of an occupant left inside the vehicle while unattended.

Side impact air-bags of a vehicle are most effective during an accident when the adjacent window such as window 2 is fully closed. It is therefore desired to close window 2 prior to a side impact collision. Collision sensors in the vehicle signal to controller 3 that a collision is about to occur. When controller 3 receives a collision sensor signal on its crash preparation input 59 the controller responds by rapidly closing window 2 before the collision occurs. This response by controller 3 is possible because of the low obstruction detection force characteristics of control system 11 which permit automatic control over movement of window 2.

As an added security feature, crash preparation sensors of the vehicle detect persons near the vehicle. Controller 3 monitors its crash preparation input 59 to guard the vehicle against intrusion. Controller 3 cancels or postpones venting and closes window 2 to avoid intrusion when a person nears the vehicle during venting.

Figure 8:
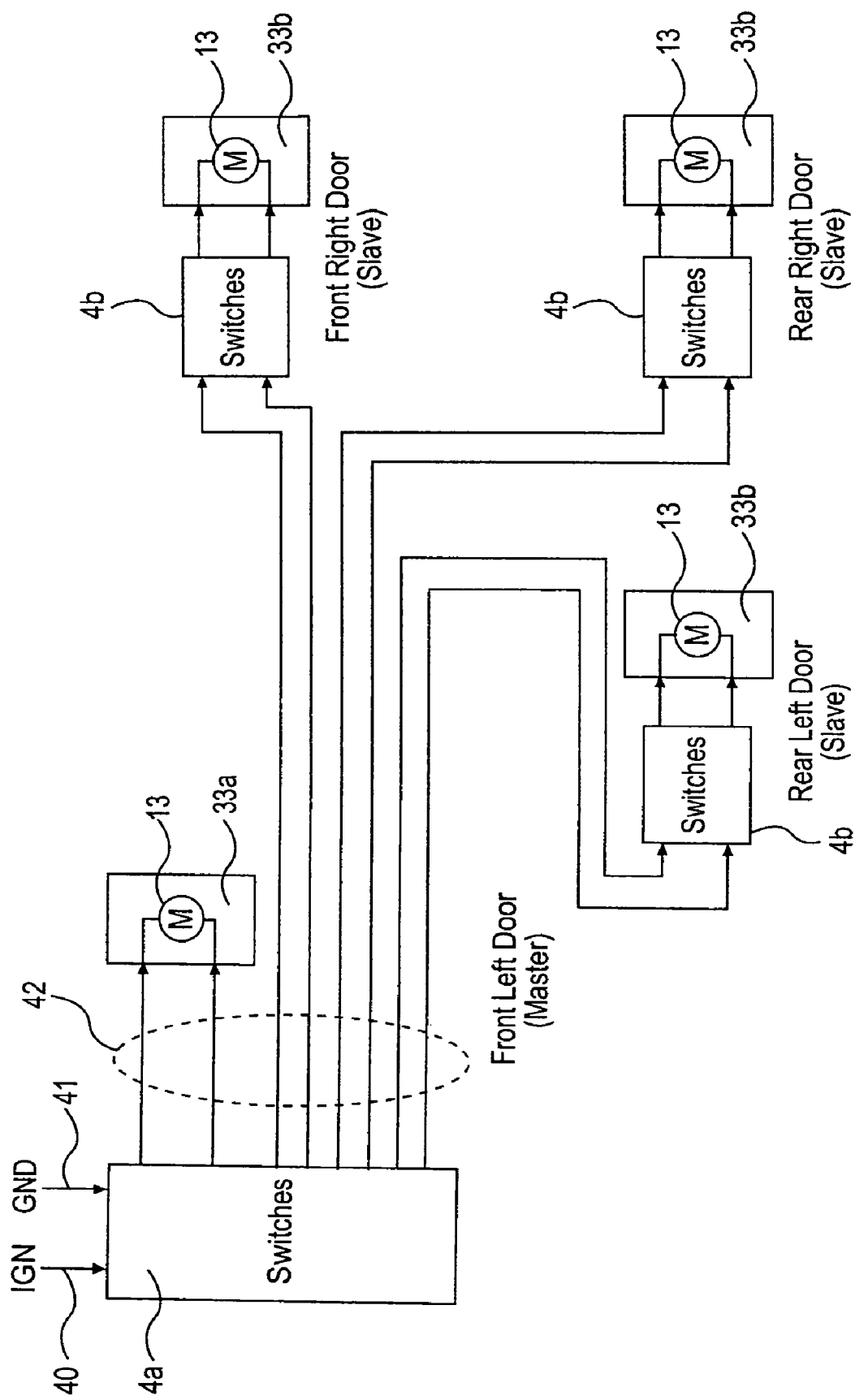
FIG. 8 illustrates traditional electric window lift controls interconnected in a vehicle by traditional vehicle wiring.

Referring now to FIG. 8, with continual reference to FIGS. 1 and 2, traditional electric window lift controls 33 interconnected in a vehicle by traditional vehicle wiring 42 is shown. Each window lift control 33 is associated with a respective vehicle window. Window lift controls 33 include driver-side window lift control 33a and three passenger-side window lift controls 33b. A driver-side switch console 4a enables an operator to operate the driver-side window via window lift control 33a and to remotely operate the passenger-side windows via window lift controls 33b. An individual passenger-side switch console 4b is positioned near each passenger window for the passengers to operate the passenger windows via window lift controls 33b. Window lift control 33a controls movement of the driver-side window in response to driver commands received from switch console 4a. Window lift controls 33b control movement of their associated passenger-side windows in response to passenger commands received from their associated switch consoles 4b or in response to driver commands received from switch console 4a.

Battery power is directly routed through wiring 42 to motors 13 associated with window lift controls 33 from an ignition circuit 40 through switch consoles 4a and 4b. Furthermore, battery power (ignition) 40 and ground return 41 supplied to each passenger switch console 4b passes through driver switch console 4a. This adds complexity to wiring 42. Each time an operator uses a switch console 4 to issue a switch command for activating window movement the switch consoles and associated wiring must pass start-up and operating electrical currents to the associated motor without substantial power losses. Depending on the reliability level and power requirements of window lift controls 33, the resulting complex wiring 42 and high current switches 4 can be bulky and costly.

As will further be explained with reference to FIGS. 9, 10, 11, and 12, control system 11 eliminates the need for bulky wiring and high current switches by virtue of its active electronics (i.e., microprocessor 12 of controller 3) used to control motor 13. Controller 3 receives window movement commands 5 from a switch console 4 as low power signals. Controller 3 then manages power and electrical polarity from the motor power source to motor 13 in order to create window movement by transmitting the appropriate electronic switching signals to the motor.

Figure 9:
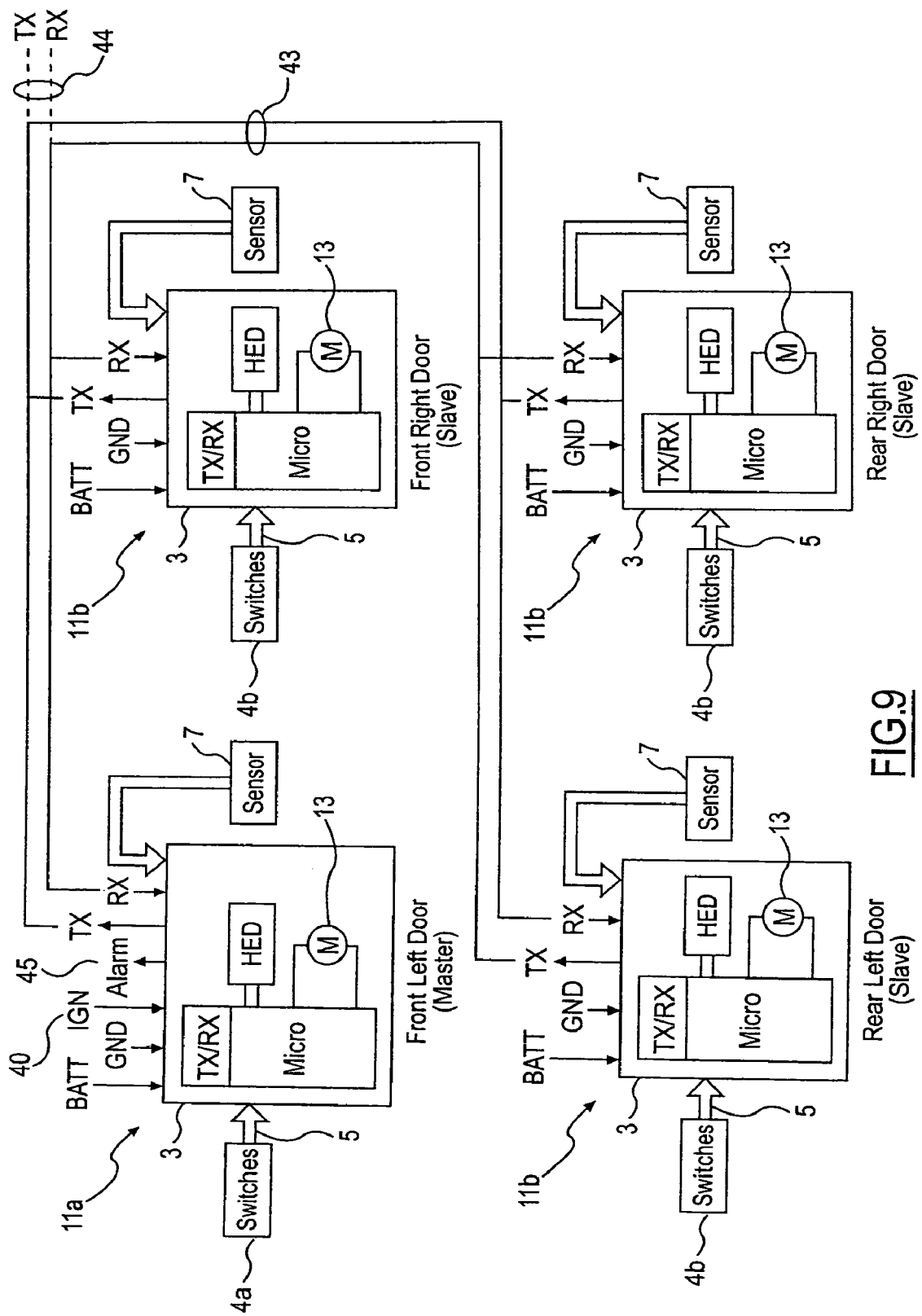
FIG. 9 illustrates control systems interconnected in a vehicle by a local area network (LAN) in accordance with an embodiment of the present invention.

Referring now to FIG. 9, with continual reference to FIGS. 1, 2, and 8, multiple control systems 11 interconnected in a vehicle by a LAN 43 in accordance with an embodiment of the present invention is shown. Each control system 11 is associated with a respective vehicle window. Control systems 11 include driver-side control system 11a and three passenger-side control systems 11b. A driver-side switch console 4a enables a driver to operate the driver-side window and to remotely operate the three passenger-side windows. An individual passenger-side switch console 4b is positioned near each passenger window for the passengers to operate the passenger windows. Control system 11a controls movement of the driver-side window in response to driver commands received from switch console 4a. Control systems 11b control movement of their associated passenger-side windows in response to passenger commands received from their associated switch consoles 4b or in response to driver commands received from switch console 4a.

The configuration shown in FIG. 9 further enhances function, performance, and vehicle cost savings associated with control systems 11. With a control system 11 installed for each window, switch consoles 4 do not pass high electrical currents necessary to operate motors 13. As such, switch consoles 4 having lower current ratings can be incorporated thereby lowering component cost while increasing the operating life and reliability of the switch consoles. Wire harnesses connecting command signals 5 of switch consoles 4 to control systems 11 can be replaced by high gauge wire of less weight.

Further reduction in vehicle weight is realized as control systems 11 are interconnected to each other and to switch consoles 4 by LAN 43. LAN 43 can either be a private LAN reserved for control systems 11 or can be expanded to a larger in-vehicle LAN 44 such as LIN, CAN, or J1850 to permit communications with other vehicle modules. Regardless of which protocol is selected, LAN 43 makes for simpler connection between switch consoles 4 and control systems 11 by reducing the number of wire interconnects. Besides communicating window commands, LAN 43 permits multiple control systems 11 to share information between each other and with other connected electronic devices. Access to additional vehicle data from in-vehicle LAN 44 can improve performance of control systems 11 as the control systems stay informed of the operating environment and status of the vehicle.

Controller 3 of driver-side control system 11a is well positioned to receive switch commands 5 from driver-side switch console 4a when the driver-side switch console is also located on the driver's door. In this way the length of the wire harness connecting switch commands 5 from switch console 4a to controller 3 of control system 11a is kept to a minimum. The switch commands intended for passenger windows can be transmitted over LAN 43 and read by other window control systems 11b. By transmitting switch commands over LAN 43 the vehicle switch harness is reduced to a two-wire signal harness thereby saving vehicle weight and cost while enhancing communications between control systems 11.

Figure 10:
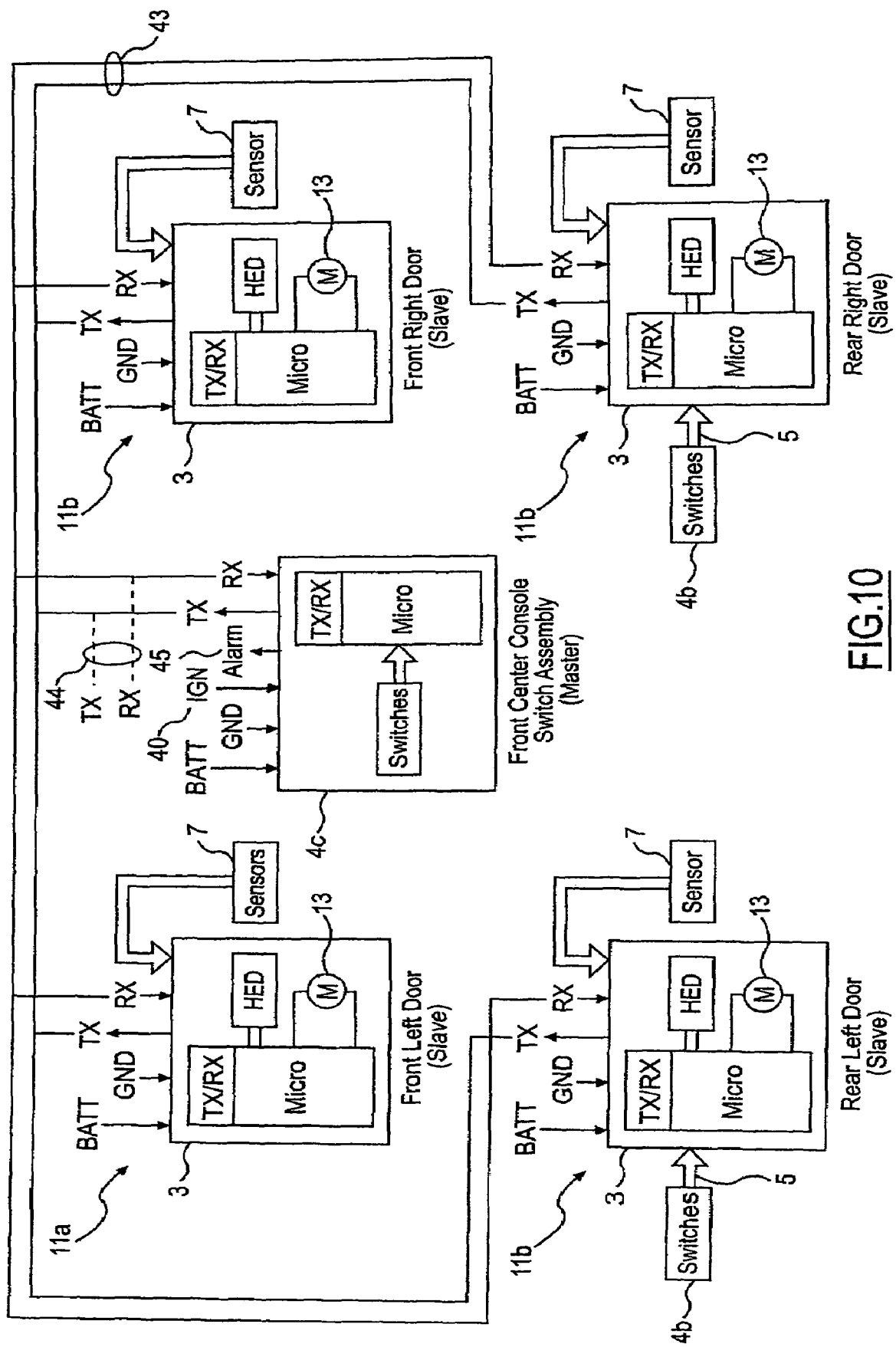
FIG. 10 illustrates control systems having an independent master switch console in which the control systems and switch consoles including the independent switch console are interconnected in a vehicle by a LAN in accordance with an embodiment of the present invention.

Referring now to FIG. 10, with continual reference to FIGS. 1, 2, and 9, multiple control systems 11 having an independent master switch console 4c in which the control systems and the switch consoles including the master switch console are interconnected in a vehicle by a LAN 43 in accordance with an embodiment of the present invention is shown. The configuration of FIG. 10 represents a configuration slightly modified from the configuration shown in FIG. 9 in that switch console 4c is separate from driver-side control system 11a. Switch console 4c directly connects to LAN 43 and is not dependent upon driver-side control system 11a to communicate commands to passenger-side control systems 11b. Switch console 4c can be located anywhere near the driver such as between the front seats, on the steering wheel, on the dash, etc. When located between the front seats, as indicated in FIG. 9, switch console 4c doubles as a remote switch console for the front passenger to use to operate the front passenger window. This way a common center switch console 4c for both the driver and the front passenger is implemented for cost savings. This network communications approach gives freedom in locating switch console 4c elsewhere to enhance vehicle styling and ergonomics. Also switch console 4c can serve as a master control for monitoring vehicle status like ignition signal 40 and reporting the status of all control systems 11 through a single alarm output 45.

An in-vehicle LAN 44 permits control systems 11 to access information shared by other electronic control modules already connected to the network. Communications with other modules increases the number of functions control systems 11 can perform. Likewise, it can make new functions possible such as automatic venting, occupant detection, and security monitoring.

Figure 11:
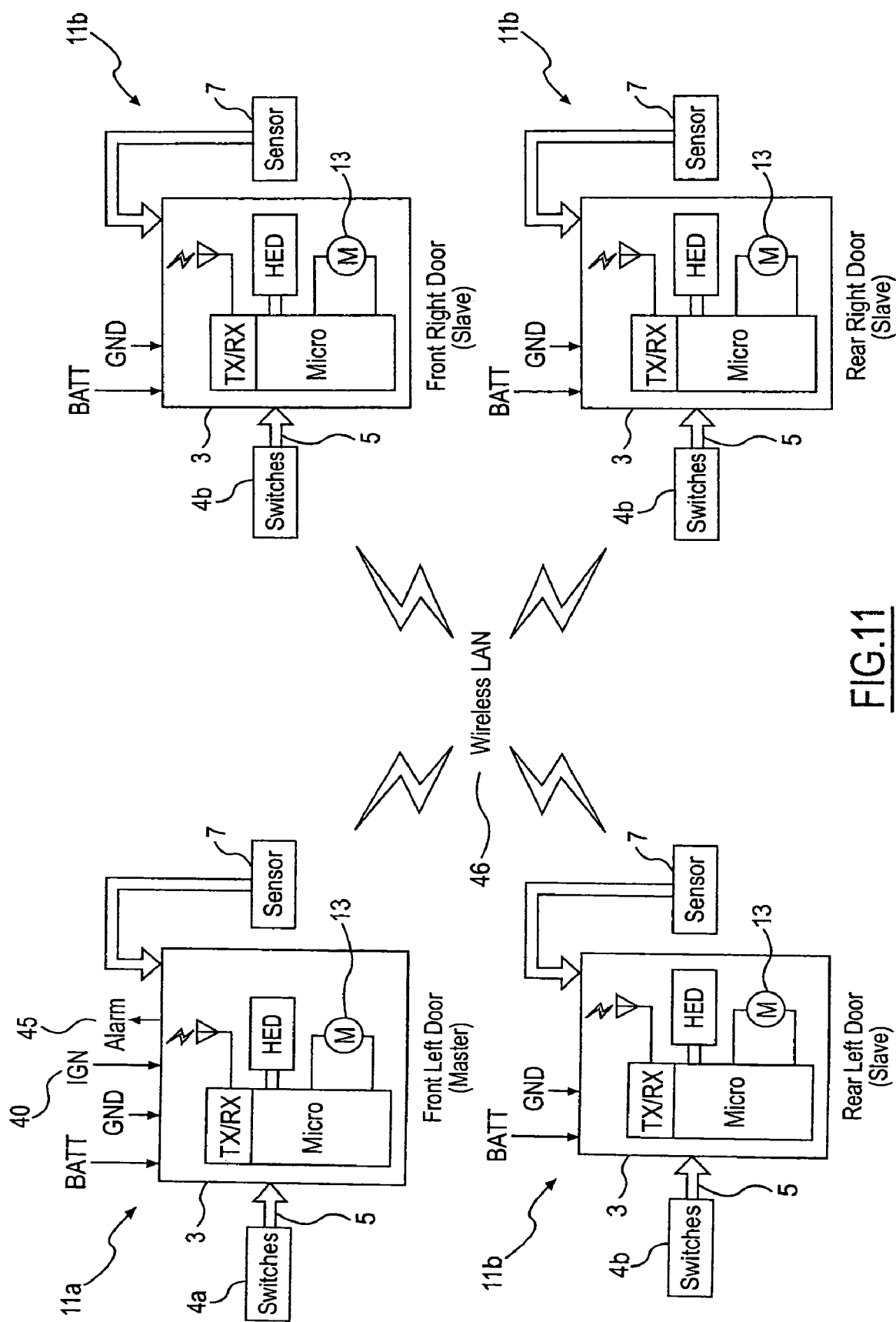
FIG. 11 illustrates control systems interconnected in a vehicle by a wireless LAN in accordance with an embodiment of the present invention.

Referring now to FIG. 11, with continual reference to FIGS. 1, 2, and 9, multiple control systems 11 interconnected in a vehicle by a wireless LAN 46 in accordance with an embodiment of the present invention is shown. The wireless radio-frequency (RF) communications 46 of FIG. 11 represents another approach of interconnecting control systems 11 to switch consoles 4. This approach has similar advantages to the wired LAN approach described previously with respect to FIG. 9 but has further advantages in vehicle weight and cost savings through elimination of wiring used to interconnect control systems 11 to switch consoles 4. Wireless RF network 46 allows placement of switch consoles 4 virtually anywhere on the vehicle while control systems 11 remain optimized for placement near their associated windows and their associated motors.

Figure 12:
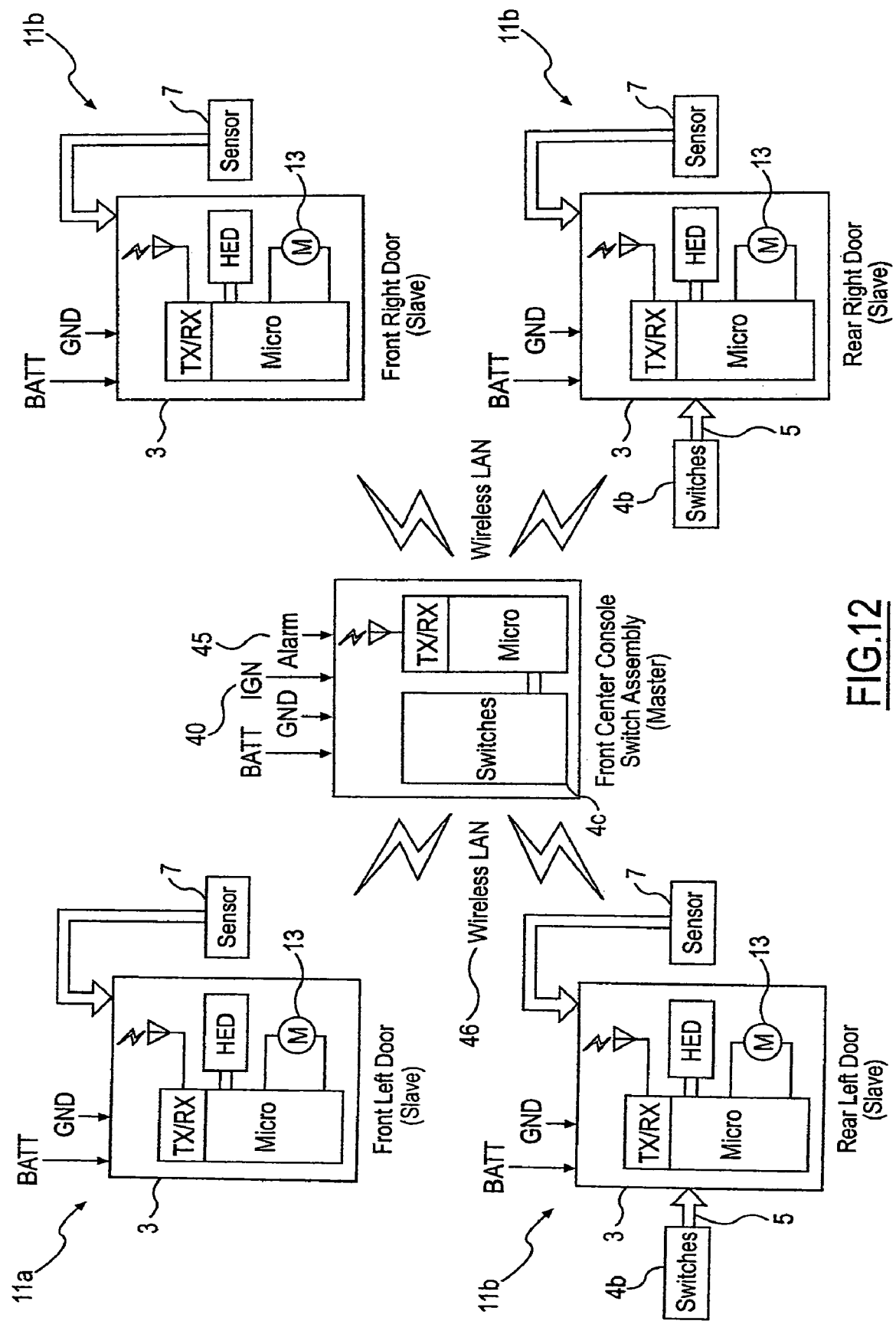
FIG. 12 illustrates control systems having an independent master switch console in which the control systems and the independent switch console are interconnected in a vehicle by a wireless LAN in accordance with an embodiment of the present invention.

Referring now to FIG. 12, with continual reference to FIGS. 1, 2, and 10, multiple control systems 11 having an independent master switch console 4c in which the control systems and the independent switch console are interconnected in a vehicle by a wireless LAN 46 in accordance with an embodiment of the present invention is shown. The wireless radio-frequency (RF) communications 46 of FIG. 12 represents another approach of interconnecting control systems 11 to switch console 4c. This approach has similar advantages to the wired LAN approach described previously with respect to FIG. 10 but has further advantages in vehicle weight and cost savings through elimination of wiring used to interconnect control systems 11 to switch consoles 4. Wireless RF network 46 allows placement of switch consoles 4 virtually anywhere on the vehicle while control systems 11 remain optimized for placement near their associated windows and their associated motors.

Control system 11 has been mostly described as an independent control system having multiple interconnections and communications with various other electronic control modules on the vehicle. To further reduce the cost and number of vehicle electronic subsystems it is advantageous to integrate those electronic controls that process related information or have proximate mounting locations to the control system. For example, the advanced electronics within control system 11, along with its location inside the vehicle door, permit the control system to control other functions such as electronic door lock, remote keyless entry, power mirror adjust, heated mirror, mirror fold away, mirror mounted blinkers, entry/exit lighting, puddle lighting, etc. Module integration can improve both the response and the reliability of electronic systems over conventional independent controls. Cost and vehicle weight savings are inevitable.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A system comprising:
a controller operable for transmitting a panel control signal to a motor for the motor to move a movable panel of a vehicle along a path between opened and closed positions while the motor receives power from a power source, wherein the motor receives power from the power source upon receiving the panel control signal;
a sensor operable for detecting objects in the path of the panel without monitoring the motor, wherein the sensor generates an object signal indicative of an object being detected in the path of the panel; and
wherein, when the panel is moving in a closing direction, the controller transmits a panel control signal to the motor to reverse movement of the panel to an opening direction upon receiving the object signal in order to prevent the panel from entrapping an object;
wherein the controller communicates with vehicle modules over an in-vehicle local area network (LAN).

2. The system of claim 1 wherein:
the controller communicates with the sensor over the LAN.

3. The system of claim 1 wherein:
the sensor includes a compressible dielectric element interposed between two conductors which are separated from one another;
wherein capacitance of the sensor changes in response to either an object in the path of the panel deforming the shape of the sensor while touching the sensor such that the sensor generates the object signal or a conductive object in the path of the panel coming into proximity with the sensor such that the sensor generates the object signal.

4. The system of claim 1 wherein:
the controller is operable for desensitizing the object signal to counter effects of the panel on the sensor as the panel moves relative to the sensor.

5. The system of claim 1 wherein:
the controller receives a command signal from a switch over the LAN upon the switch being activated by an operator, wherein the controller transmits a panel control signal to the motor to move the panel along the path in accordance with the command signal.

6. The system of claim 5 wherein:
the controller transmits a panel control signal to the motor to move the panel along the path to the closed position upon receiving an express close panel command signal from the switch over the LAN;
the controller transmits a panel control signal to the motor to move the panel along the path to the opened position upon receiving an express open panel command signal from the switch over the LAN;
the controller transmits a panel control signal to the motor to move the panel along the path in a closing direction while receiving a manual close panel command signal from the switch over the LAN;
the controller transmits a panel control signal to the motor to move the panel along the path in an opening direction while receiving a manual open panel command signal from the switch over the LAN.

7. The system of claim 6 wherein:
the controller aborts an express panel command upon receiving a manual panel command;
the controller aborts an express panel command for one of the opening and closing directions upon receiving an express panel command for the opposite direction.

8. The system of claim 1 wherein:

the controller receives an internal temperature signal indicative of the temperature of the vehicle interior from an interior temperature sensor over the LAN and receives an external temperature signal indicative of the temperature outside of the vehicle from an external temperature sensor over the LAN;

wherein the controller transmits a panel control signal to the motor to move the panel in the opening direction in order to vent the vehicle upon the controller determining that vehicle venting is desired based on a comparison of the temperature signals.

9. The system of claim 8 wherein:

the controller receives an occupant signal indicative of the absence of occupants in the vehicle from an occupant detection sensor over the LAN, wherein the controller generates an alarm signal indicative of vehicle intrusion upon receiving the object signal from the sensor after the panel has been moved in the opening direction while the vehicle is unoccupied.

10. The system of claim 8 wherein:

the controller transmits a panel control signal to move the panel in the opening direction in order to vent the vehicle upon the controller determining that vehicle venting is desired based on a comparison of the temperature signals when the vehicle is in operation.

11. The system of claim 8 wherein:

the controller is operable to communicate with a rain sensor of the vehicle over the LAN, wherein the controller receives a rain sensor signal indicative of moisture outside the vehicle from the rain sensor over the LAN;

wherein the controller transmits a panel control signal to the motor to move the panel in the closing direction upon the controller determining the presence of moisture outside of the vehicle based on the rain signal.

12. The system of claim 8 wherein:

the controller transmits a vent control signal to a venting component of the vehicle via the LAN in order for the venting component to vent the vehicle upon the controller determining that the vehicle venting via the venting component is desired based on a comparison of the temperature signals.

13. The system of claim 12 wherein:

the venting component is one of a vehicle sunroof and a vehicle HVAC system.

14. The system of claim 12 wherein:

the controller transmits a vent control signal to the venting component in order to vent the vehicle when the internal temperature exceeds the external temperature by a predetermined amount and the vehicle is unoccupied.

15. The system of claim 12 wherein:

the controller transmits a vent control signal to the venting component in order to vent the vehicle when the internal temperature exceeds the external temperature by a predetermined amount and the vehicle is in operation.

16. The system of claim 1 further comprising:

a second controller operable for transmitting a panel control signal to a second motor for the second motor to move a second movable panel of the vehicle along a path between opened and closed positions while the second motor receives power from the second power source, wherein the second motor receives power from the second power source upon receiving the panel control signal;

a second sensor operable for detecting objects in the path of the second panel without monitoring the second motor, wherein the second sensor generates an object signal indicative of an object being detected in the path of the second panel; and wherein, when the second panel is moving in a closing direction, the second controller transmits a panel control signal to the motor to reverse movement of the second panel to an opening direction upon receiving the object signal in order to prevent the second panel from entrapping an object;

wherein the second controller communicates with vehicle modules over the LAN.

17. The system of claim 16 wherein:

the controllers communicate with one another over the LAN, wherein the LAN is either a wired LAN or a wireless LAN.

18. The system of claim 1 wherein:

the controller includes memory for storing the position of the panel along the path prior to the vehicle being turned off, wherein the controller transmits a panel control signal to move the panel from the closed position to an opened position stored in memory upon receiving a preset panel open command.

19. The system of claim 18 wherein:

the controller receives the panel open command from a remote keyless entry component.

20. The system of claim 1 wherein:

the controller is operable for transmitting a panel control signal to move the panel during a predetermined time period after the vehicle has been turned off.

* * * * *